May 27, 1969  A. A. SOUZA  3,446,572
STERILIZER
Filed March 29, 1965
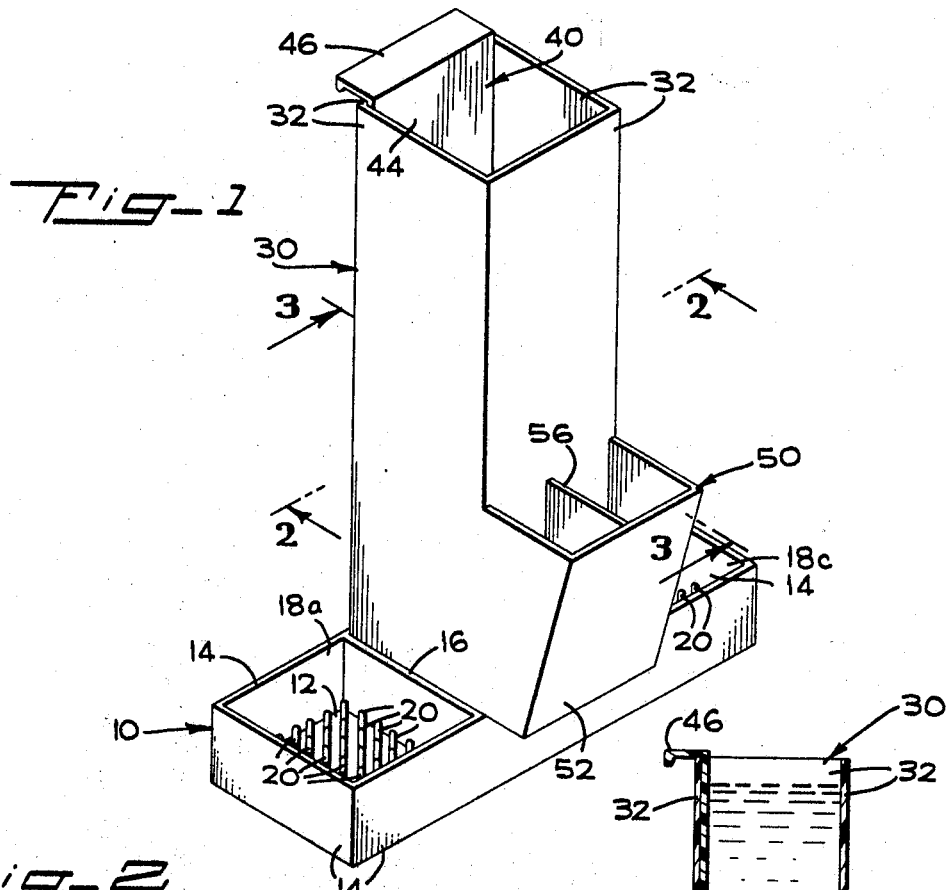
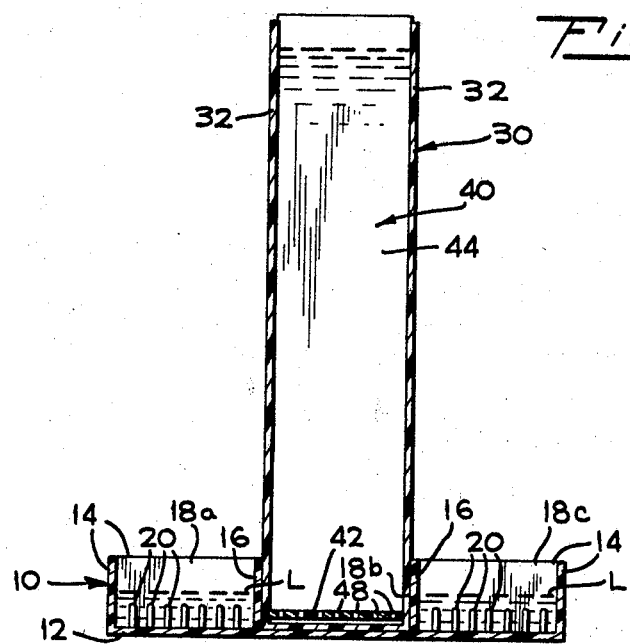
INVENTOR
AUGUSTINE A. SOUZA
BY Paul B. Fihe
PATENT AGENT

United States Patent Office 3,446,572
Patented May 27, 1969

3,446,572
STERILIZER
Augustine A. Souza, 431 Casa Blanca Drive,
San Jose, Calif. 95129
Filed Mar. 29, 1965, Ser. No. 443,247
Int. Cl. A61b 3/00
U.S. Cl. 21—83                                    2 Claims

ABSTRACT OF THE DISCLOSURE

A sterilizer for barber implements including a shallow receptacle with intermediate partitions forming at least two compartments, a second, relatively deep receptacle dimensioned for removable reception in one of these compartments together with a ladle including an implement-supporting platform arranged for removable reception in such deep receptacle.

---

The present invention relates generally to sterilizing equipment, and more particularly, to a sterlizer for various implements utilized by barbers such as combs, scissors, clippers, and the like.

Sterilization of barber's implements is obviously desireable, and has, in certain areas, been made legally requisite. However, sterilization equipment such as used by doctors is not applicable since repeated and ready access to the implement is an obvious necessity concomitant with the cleansing and sterilizing requirements.

Accordingly, it is a general object of the present invention to provide a sterilizer including a number of compartments providing maximum access for sterilization and cleansing of various implements commonly employed by barbers.

More particularly, it is a feature of the invention to provide a sterilizer including a shallow compartment having a plurality of laterally spaced fingers projecting from the bottom thereof to a level below the level of sterilizing liquid therewithin so that an implement is restricted in its depth of entry into the sterilizing liquid, yet hair clippings may accumulate at the bottom of the compartment between the spaced fingers.

Another feature of the invention is the provision of a rather deep compartment within which combs or other elongated articles can be completely immersed in sterilizing liquid yet can be readily retrieved by a ladle-type unit removably supported within such compartment.

More particularly, the aforementioned ladle is arranged in accordance with the present invention to have a transverse dimension substantially equivalent to the interior dimension of the compartment wherefore all combs or other implements placed therewithin are effectively withdrawn when desired.

A correlated feature of the invention is the provision of apertures in such ladle to permit the flow of sterilizing liquid and any entrained hair clippings therethrough.

Additionally, it is a feature of the invention to provide a sterilizer having multiple compartments for various implements in units which may be assembled for use but separated for storage or cleansing.

These as well as additional objects and features of the invtntion will become more apparent from a perusal of the following description of one embodiment of the present invention illustrated in the accompanying drawing wherein:

FIG. 1 is a perspective view of the assembled sterilizer unit,

FIG. 2 is a vertical sectional view taken along line 2—2 of FIG. 1, and

FIG. 3 is a vertical sectional view taken along line 3—3 of FIG. 1.

The illustrated structure is formed in three separable units or elements, one of which constitutes a shallow receptacle 10 including a flat bottom 12 and upstanding side walls 14 as well as two interior partitions 16 forming three separate compartments 18a, 18b, 18c. Within each of the two end compartments 18a and 18c, a plurality of fingers 20 are integrally secured to the bottom 12 to extend upwardly therefrom in laterally-spaced relation. The fingers 20 extend upwardly somewhat less than half the depth of the compartments 18a, 18c and more particularly to a level substantially under the level of liquid indicated at L which is normally maintained within such compartments.

The described compartments 18a, 18c are utilized for sterizing the cutting teeth of conventional electric or manual clippers as employed by barbers. The clipper can be immersed in the sterilizing liquid but is restricted from full insertion to the bottom of the compartment by the upstanding fingers 20. As a consequence, hair clippings on the clippers will be dislodged therefrom by the sterilizing liquid and will subsequently fall between the fingers 20 to the bottom of the compartment. The liquid above the fingers 20 will remain free from hair clippings and permit subsequent immersion of the clippers without exposure to the previously-deposited hair clippings.

The central compartment 18b in the shallow receptacle 10 is arranged to provide a recessed seat for reception of an elongated receptable 30 having side walls 32 of generally rectangular transverse configuration whose exterior dimensions are arranged to be slidingly received within the central compartment in the shallow receptacle in the manner illustrated. The depth of this second receptacle 30 is sufficient to enable complete immersion of combs or similar barber implements when filled with sterilizing liquid to the level, also indicated at L.

To allow such complete immersion of combs or other implements yet facilitate removal from the sterilizing liquid when required, a ladle 40 is received within the deep receptacle 30, such ladle consisting of an implement-supporting platform 42 having transverse dimensions substantially equivalent to the interior dimensions of the deep receptacle so that any combs resting on such platform will be withdrawn when the same is lifted. To facilitate such lifting, a handle 44 is secured to the platform 42 and rises along one side of the receptacle to a hooked end or flange 46 at its upper extremity that is arranged to engage the upper lip of the receptacle 30. Preferably, as illustrated, when the hooked end 46 is in engagement with the lip of the receptacle 30, the implement supporting platform 42 is at a position slightly above the bottom of the receptacle. The platform 42 is provided with a plurality of apertures 48 so that when the ladle 40 is lifted to enable withdrawal of a comb or other implement from the receptacle 30, liquid can flow downwardly through such apertures. When liquid flows through the apertures 48 in this manner, any hair clippings on the platform 42 are entrained therewith and pass through the apertures into the space below the platform and will thereafter remain on the bottom of the receptacle 30 until the receptacle is cleansed, for example, at the end of the working day.

An additional receptacle 50 is formed on the one side of the described deep receptacle 30 for the reception of scissors or the like and preferably is formed by side walls constituting integral extensions of the walls 32 of the deep receptacle, a slanted front wall 52 and a bottom 54 disposed to engage the lip of the shallow receptacle 10 when the deep receptacle 30 is fully inserted within the central compartment 18b thereof. Such arrangement provides for stability of the deep receptacle 30 within its receiving compartment or seat. This additional receptacle 50 includes a central partition 56 which extends from its upper lip downwardly to a terminal end spaced from the bottom 54 so that sterilizing liquid may circulate between the two sections formed on opposite sides of the dividing partition 56. The dimensions are such that substantially only the cutting end of the scissors is disposed in the sterilizing liquid which is placed within the receptacle 50 to a level indicated at L and the dividing partition assists in maintaining a generally upright disposition of the scissors received therewithin to facilitate manual access thereto.

At the end of a working day, the three elements are readily separated and subsequently cleansed and can be readily reassembled the following morning and filled with suitable quantities of sterilizing liquid preparatory to continuing use.

Obviously, various modifications and/or alterations in the described structure can be made without departing from the spirit of the invention, and the foregoing description of one embodiment is to be considered purely as exemplary and not in a limiting sense. The actual scope of the present invention is indicated by reference to the appended claims.

What is claimed is:

1. A sterilizer for barber implements or the like which comprises
   a first shallow receptacle having at least two compartments,
   a second deep receptacle having constant transverse dimensions enabling removable reception in one of said compartments in said shallow receptacle and having an open top and
   a generally L-shaped ladle removably received within said deep receptacle and including a perforated implement-supporting platform having exterior dimensions slightly less than the interior dimensions of said deep receptacle and a handle extending upwardly from said implement-supporting platform along one side of said deep receptacle and having a hooked flange at its upper end to engage the open top of said deep receptacle at a position such that the implement-supporting platform is suspended in a position above the bottom of said deep receptacle.

2. A sterilizer for barber implements or the like according to claim 1 which comprises
   a third receptacle formed integrally on one side of said deep receptacle and having a bottom arranged to engage the top of said shallow receptacle when said second deep receptacle is seated therein.

References Cited

UNITED STATES PATENTS

| | | | |
|---|---|---|---|
| 763,936 | 6/1904 | Stilwell | 21—86 XR |
| 1,446,520 | 2/1923 | Smith | 21—88 XR |
| 1,827,479 | 10/1931 | Lierman | 21—87 |
| 1,946,573 | 2/1934 | De Vries | 21—86 |
| 1,973,155 | 9/1934 | Scioscia | 21—87 |
| 1,973,156 | 9/1934 | Scioscia | 21—87 |
| 1,987,822 | 1/1935 | Gregory. | |
| 2,556,495 | 6/1951 | Freedman | 21—91 |
| 2,929,117 | 3/1960 | Kosswig | 21—86 |
| 3,019,494 | 2/1962 | Horie et al. | 21—83 XR |
| 3,082,050 | 3/1963 | Baxter et al. | 21—83 XR |

MORRIS O. WOLK, *Primary Examiner.*

J. T. ZATARGA, *Assistant Examiner.*

U.S. Cl. X.R.

21—87, 105